(12) United States Patent
Ramanjani et al.

(10) Patent No.: US 11,664,740 B2
(45) Date of Patent: May 30, 2023

(54) THRESHOLD DETECTION SYSTEMS

(71) Applicant: Hamilton Sundstrand Corporation, Charlotte, NC (US)

(72) Inventors: Shobha Ramanjani, Bangalore (IN); Nageswara Rao Kalluri, Bangalore (IN); Sridhar Katakam, Bangalore (IN)

(73) Assignee: Hamilton Sundstrand Corporation, Charlotte, NC (US)

(*) Notice: Subject to any disclaimer, the term of this patent is extended or adjusted under 35 U.S.C. 154(b) by 258 days.

(21) Appl. No.: 16/942,642

(22) Filed: Jul. 29, 2020

(65) Prior Publication Data
US 2021/0297005 A1 Sep. 23, 2021

(30) Foreign Application Priority Data
Mar. 17, 2020 (IN) .............................. 202041011496

(51) Int. Cl.
| | |
|---|---|
| H02P 29/024 | (2016.01) |
| H02M 7/48 | (2007.01) |
| H02P 6/28 | (2016.01) |
| H02H 7/122 | (2006.01) |
| H02M 1/32 | (2007.01) |
| H02P 27/06 | (2006.01) |

(52) U.S. Cl.
CPC .......... *H02M 7/4826* (2013.01); *H02H 7/122* (2013.01); *H02M 1/32* (2013.01); *H02P 6/28* (2016.02); *H02P 27/06* (2013.01)

(58) Field of Classification Search
CPC ......... H02M 7/4826; H02M 1/32; H02P 6/28; H02P 27/06; H02P 29/027; H02H 7/122
See application file for complete search history.

(56) References Cited

U.S. PATENT DOCUMENTS

| | | | |
|---|---|---|---|
| 4,959,602 A | 9/1990 | Scott et al. | |
| 5,126,642 A | 6/1992 | Shahrodi | |
| 5,856,736 A | 1/1999 | Rotunda et al. | |
| 8,873,206 B2 | 10/2014 | Lee et al. | |
| 9,548,658 B2 | 1/2017 | Hang et al. | |
| 2005/0083116 A1 | 4/2005 | Risbo | |
| 2014/0297144 A1 | 10/2014 | Wakao | |
| 2015/0303839 A1* | 10/2015 | Ueno | H02P 29/027 318/400.22 |

OTHER PUBLICATIONS

Extended European Search Report issued during the prosecution of corresponding European Patent Application No. 21161196.7 dated Jul. 23, 2021 (7 pages).
Extended European search report issued in corresponding EP application No. 21161196.7, dated Jul. 23, 2021.

* cited by examiner

*Primary Examiner* — Cortez M Cook
(74) *Attorney, Agent, or Firm* — Locke Lord LLP; Daniel J. Fiorello; Gabrielle L. Gelozin

(57) ABSTRACT

A threshold detection system can be configured to monitor a location (e.g., a DC link) for overcurrent. The threshold detection system can be configured to generate a pulse width modulated signal with a duty cycle that is proportional to current through the DC link. The threshold detection system can be configured to determine whether the duty cycle exceeds a selected threshold.

18 Claims, 6 Drawing Sheets

THRESHOLD DETECTION SYSTEMS

CROSS-REFERENCE TO RELATED APPLICATIONS

This application claims priority to and the benefit of Indian Application No. 202041011496, filed Mar. 17, 2020, the entire contents of which are herein incorporated by reference in their entirety.

FIELD

This disclosure relates to threshold detection systems, e.g., for overcurrent detection systems (e.g., for electric motor drive electronics).

BACKGROUND

Motor drive electronics requires high voltage DC Link current sensing to protect the power devices from overload & short circuit. A DC link over current sensing interface monitors the current and declares the over current fault based on a selected threshold. This fault triggers necessary actions to protect the power devices. Detection is possible in various ways, but fast response and high accuracy is a challenge. Slower response times lead to increase power device ratings and compromising on reliability.

Conventional methods and systems have generally been considered satisfactory for their intended purpose. However, there is still a need in the art for improved threshold detection systems. The present disclosure provides a solution for this need.

SUMMARY

In accordance with at least one aspect of this disclosure, a threshold detection system can be configured to monitor a location (e.g., a DC link) for overcurrent. The threshold detection system can be configured to generate a pulse width modulated signal with a duty cycle that is proportional to current through the DC link. The threshold detection system can be configured to determine whether the duty cycle exceeds a selected threshold.

In accordance with at least one aspect of this disclosure, a threshold detection system (e.g., for overcurrent protection or otherwise) can include a clock module configured to receive a first frequency signal of a first frequency and to output a second frequency signal having a second frequency different than the first frequency. The system can include a delay module configured to receive the second frequency signal, to delay the second frequency signal to create a third frequency signal having the second frequency with a time delay relative to the first frequency, and to output the third frequency signal. The system can include a switch module configured to receive the first frequency signal and the third frequency signal. The switch module can be configured to switch from a first output state to a second output state when a duty cycle of the first frequency signal passes a duty cycle threshold.

The system can include a modulator configured to receive a sense signal and to convert the sense signal to the first frequency signal, the modulator operatively connected to the clock module and the switch module to output the first frequency signal thereto. The sense signal can be a voltage signal or current signal, for example. The modulator can be configured to connect to a DC link current sense resistor, for example.

The clock module can be a frequency divider such that the second frequency is an integer division (e.g., ½) of the first frequency. The clock module can be a first D flip flop having a first input, a clock input, a first output, and a second output reverse to the first output. The clock input can receive the first frequency signal. The first input can be operatively connected to the second output to receive feedback therefrom, and the first output can output the second frequency signal.

The delay module can include a logic block comprising a first input, a second input, and a logic output. The logic block can be connected to the clock module via a first line at the first input and to output the third frequency signal at the logic output. The logic block can be an AND block, for example.

The delay module can include a resistor disposed between the first output of the clock module and a first input of the delay module on the first line. The delay module can include a capacitor connected between the first line and a ground at a point between the resistor and the first input. The second input of the delay module can be operatively connected to a voltage $V_{CC}$, for example.

The switch module can be a second D flip flop having a switch input configured to receive the first frequency signal, a switch clock input connected to the logic output of the logic block to receive the third frequency signal from the logic block, and a state output configured to output either the first state or the second state. The state output of the switch module can be configured to switch from the first output state (e.g., pulled low to 0) to the second output state (e.g., pulled high to 1) when a rising edge or limit of the third frequency signal occurs outside of a duty cycle of the first frequency pulse.

In certain embodiments, the duty cycle threshold can be a low threshold such that when the duty cycle of the first frequency pulse is below the low threshold, the rising edge of the third frequency signal occurs outside of a duty cycle of the first frequency pulse. In certain embodiments, the duty cycle threshold can be about 10%, for example.

In accordance with at least one aspect of this disclosure, an electric motor system can include a first threshold detection system operatively connected to a first high voltage DC link line and a second threshold detection system operatively connected to a second high voltage DC link line. Each threshold detection system can be any suitable embodiment of a threshold detection system disclosed herein, e.g., as described above. The motor system can include an OR block operatively connected to each switch module at an input of the OR block and configured to output a shutdown state if either switch module is outputting the second output state. The motor system can include a gate drive operatively connected to the OR block and configured to shut down current to an electric motor when the OR block is outputting the shutdown state.

In accordance with at least one aspect of this disclosure, a method for monitoring a DC link for overcurrent can include selecting a current threshold that is indicative of an overcurrent condition and generating a pulse width modulated signal with a duty cycle that is proportional to current through the DC link. The method can include determining whether the duty cycle exceeds the selected threshold.

In accordance with at least one aspect of this disclosure, a method for monitoring a high voltage DC link for overcurrent, can include pulse width modulating a voltage or current sense signal to output a first frequency signal, and determining if a duty cycle of the first frequency signal has passed a duty cycle threshold. Determining can include using the first frequency signal to create a constant duty cycle clock signal to compare the first frequency signal against. Determining can include using a D flip flop switch to compare the first frequency signal to the constant duty cycle clock signal. The method can include shutting down an electric motor if the duty cycle threshold is passed.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
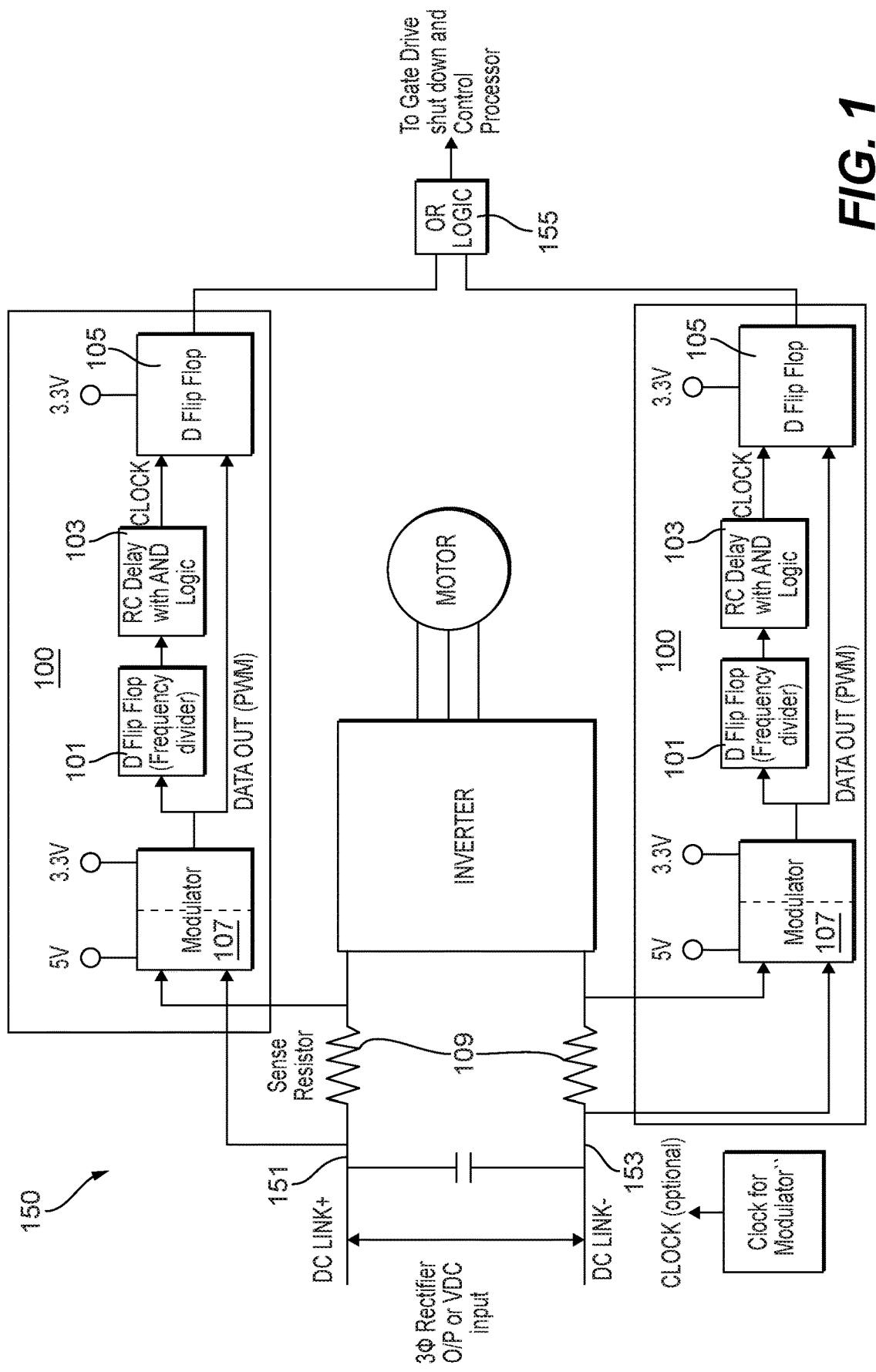
FIG. 1 is a schematic diagram of an embodiment of a motor system in accordance with this disclosure, showing an embodiment of a threshold detection system in accordance with this disclosure implemented therein in duplicate.
Figure 2:
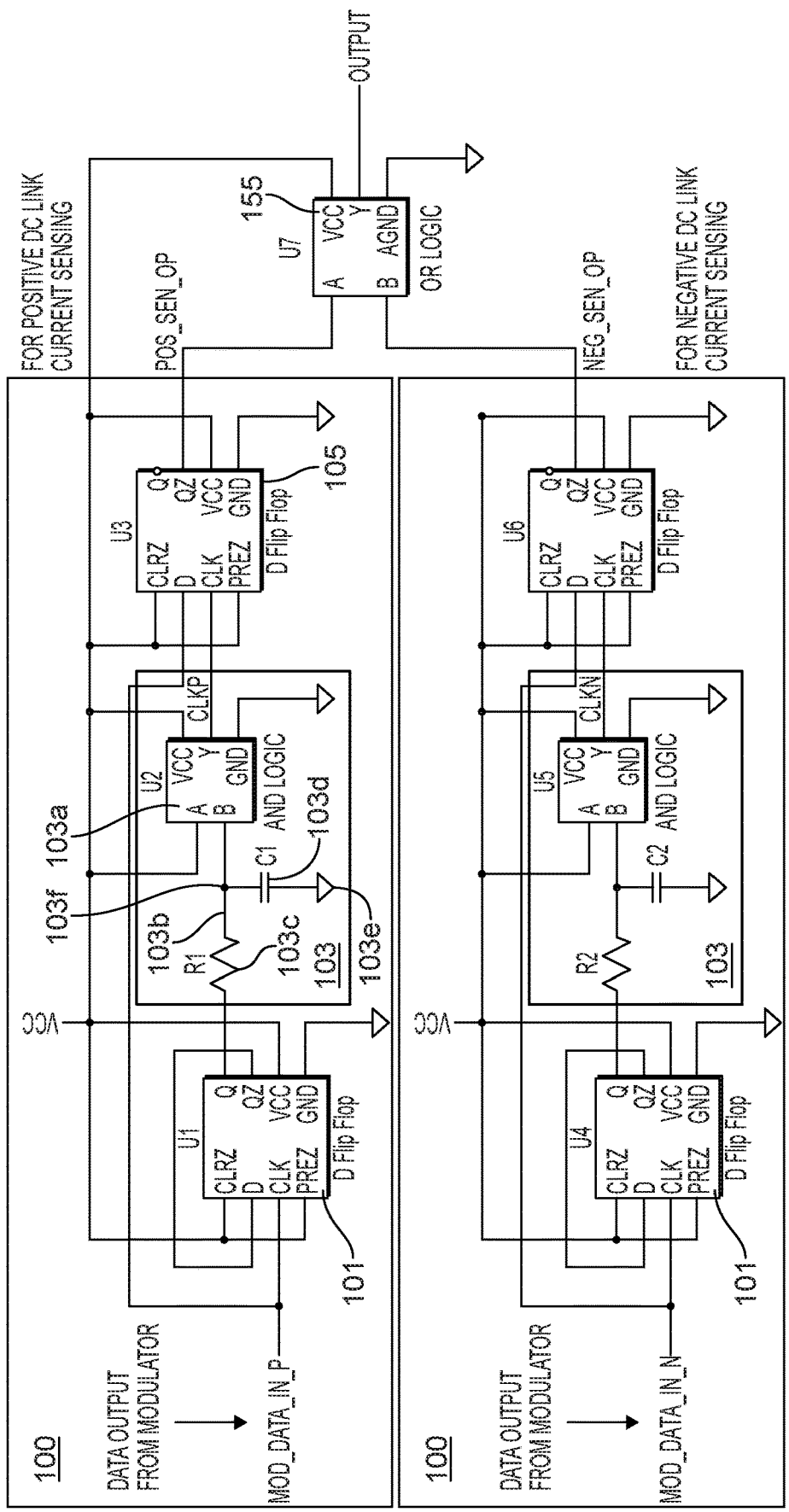
FIG. 2 shows a circuit diagram of embodiments of a threshold detection system in accordance with this disclosure.
Figure 3A:
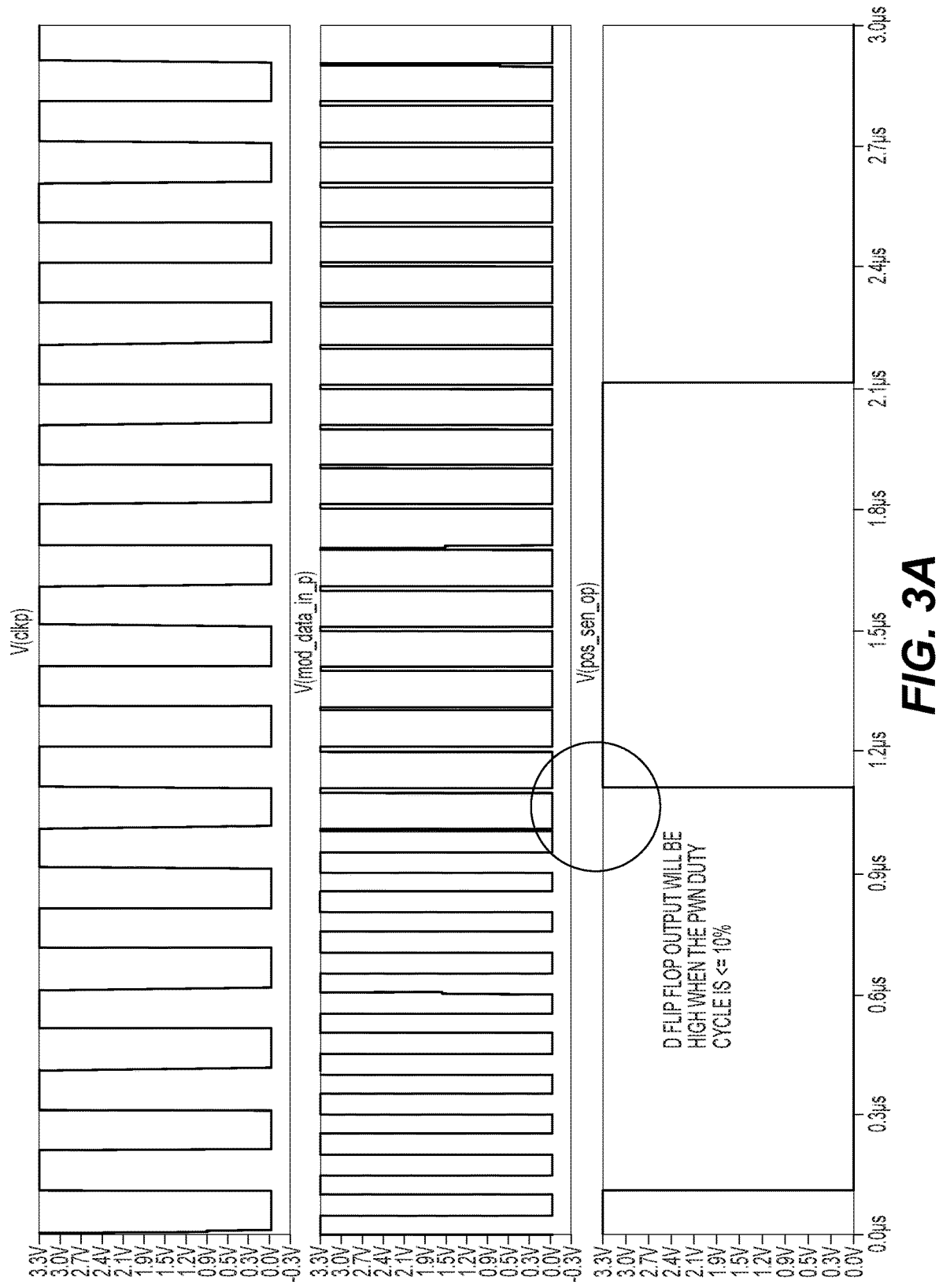
FIG. 3A-3C show an operation of an embodiment of a switch module in accordance with this disclosure, showing a clock input (top), a state input (middle) and a switch output (bottom)
Figure 3B:
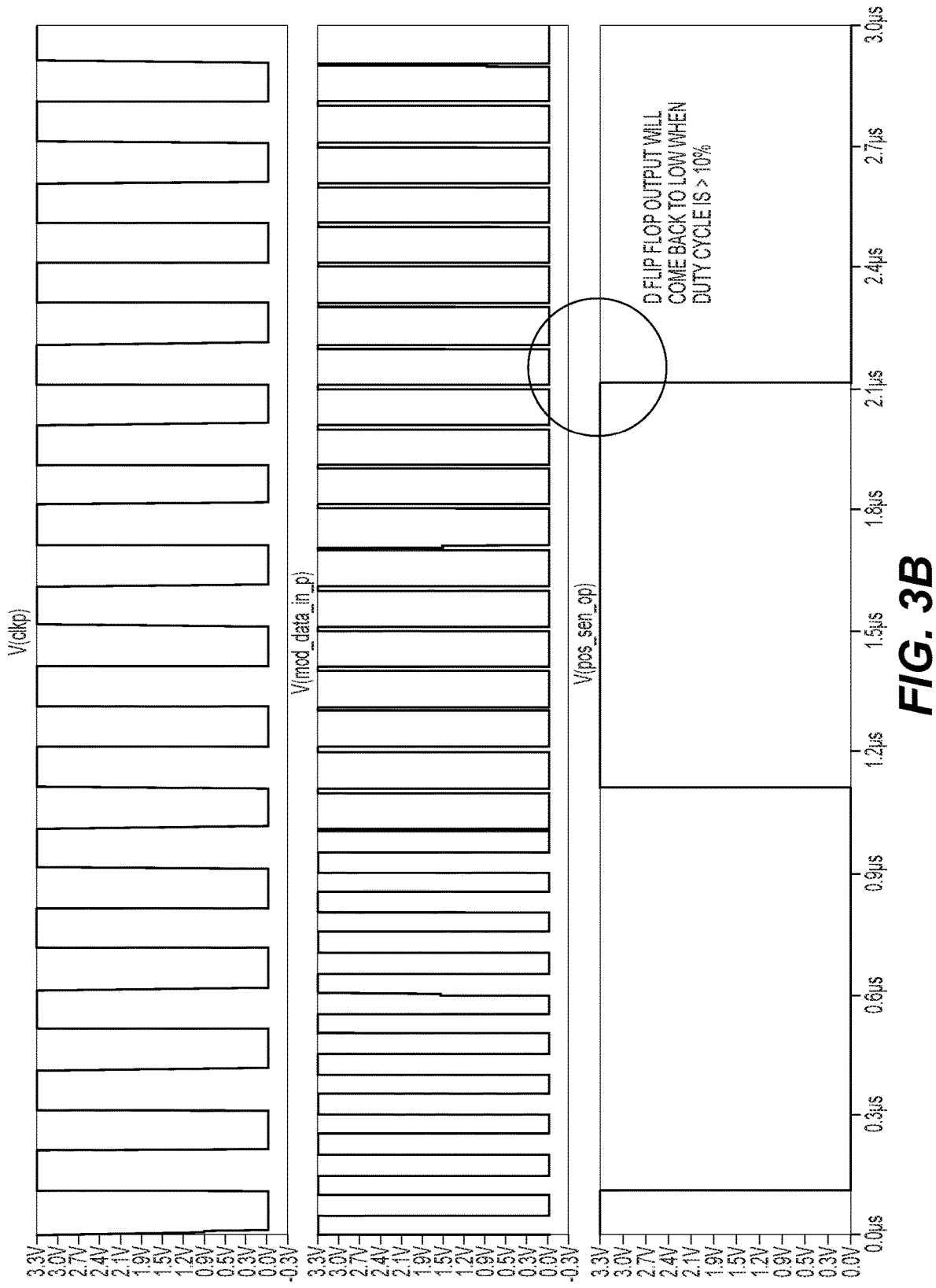
Figure 3C:
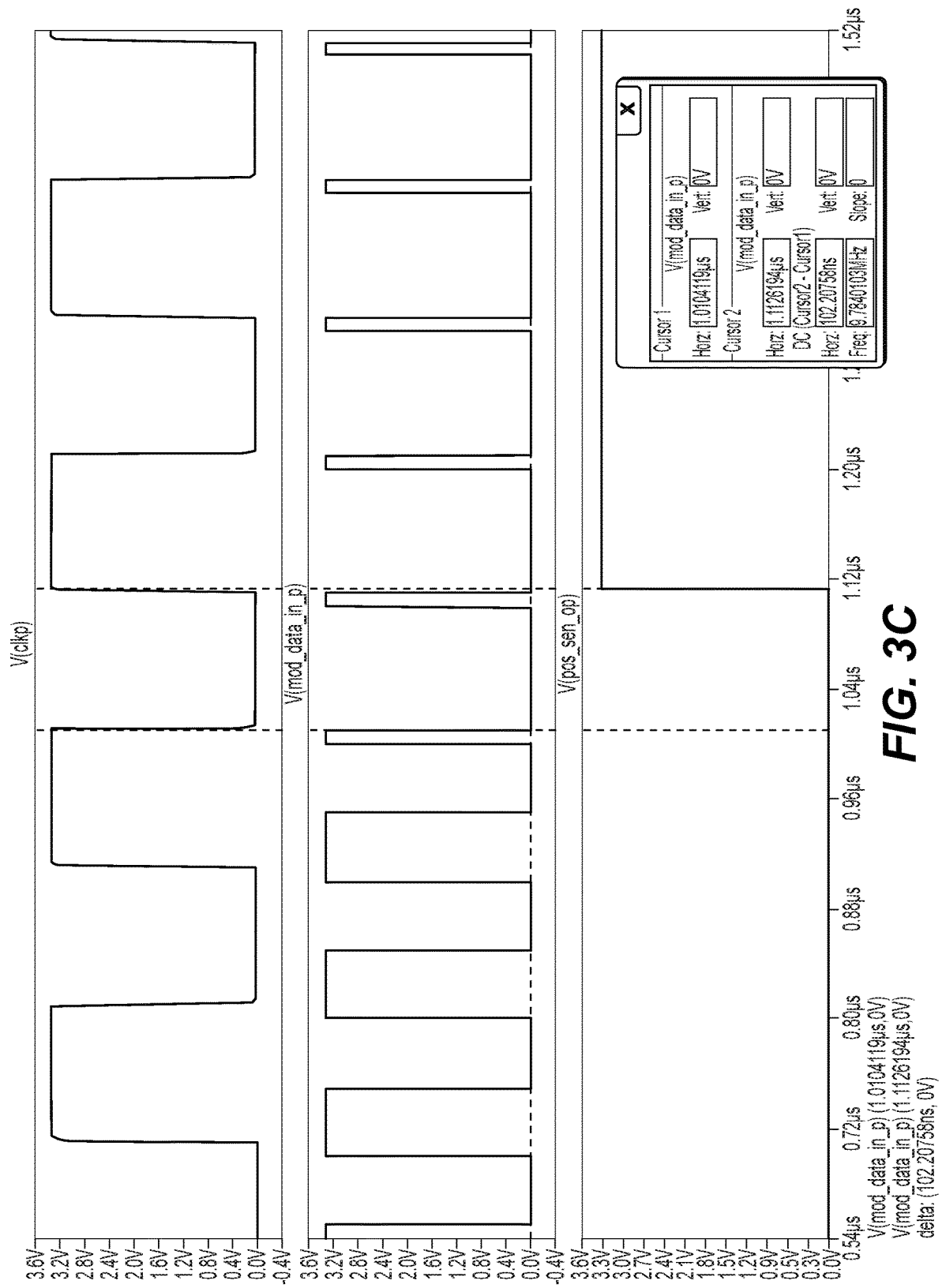
Figure 4:
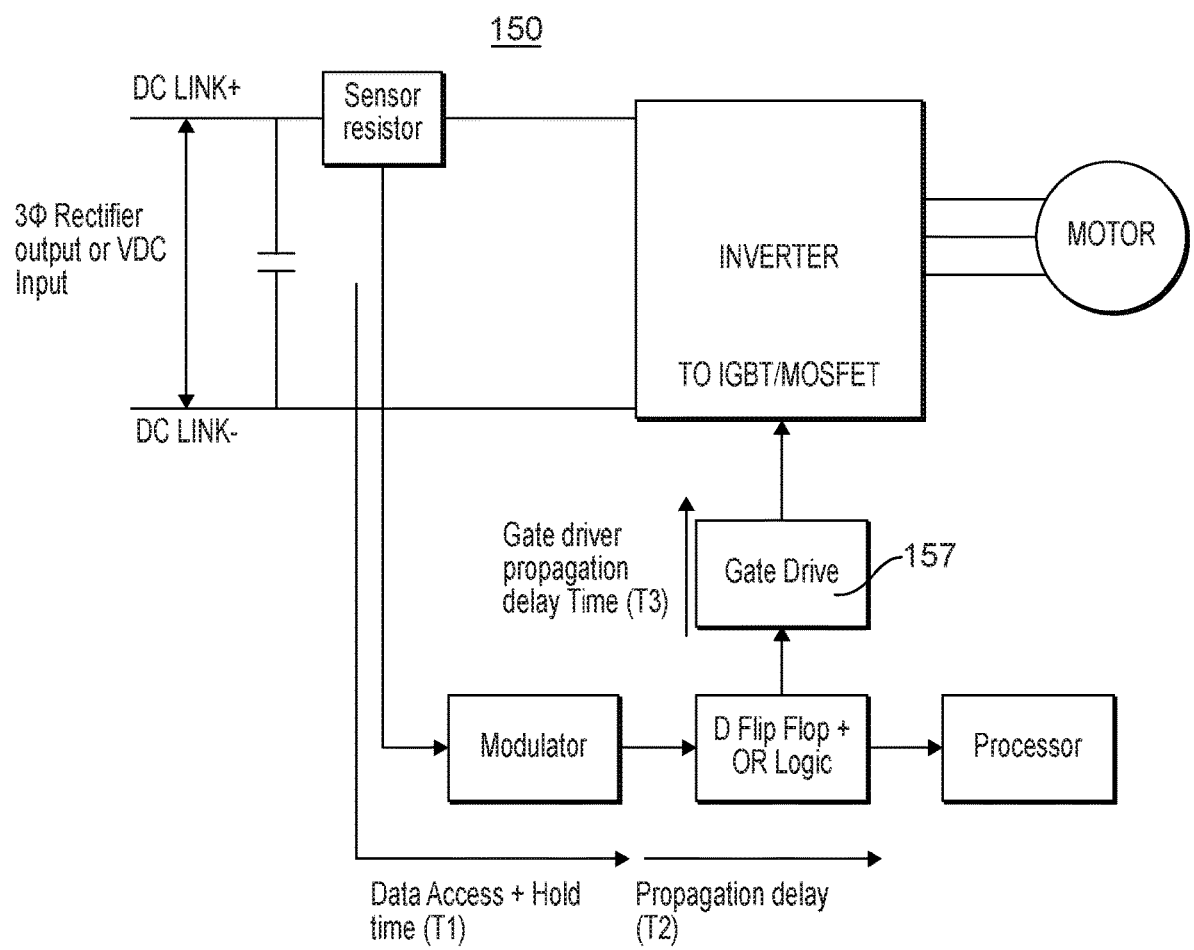
FIG. 4 is a schematic diagram indicating delay in response time of an embodiment of this disclosure.

Reference will now be made to the drawings wherein like reference numerals identify similar structural features or aspects of the subject disclosure. For purposes of explanation and illustration, and not limitation, an illustrative view of an embodiment of a threshold detection system in accordance with the disclosure is shown in FIG. 1 and is designated generally by reference character 100. Other embodiments and/or aspects of this disclosure are shown in FIGS. 2-4. Certain embodiments described herein can be used to provide overcurrent detection and to cause an action in response (e.g., to shut down current to an electric motor).

In accordance with at least one aspect of this disclosure, a threshold detection system can be configured to monitor a location (e.g., a DC link) for overcurrent. The threshold detection system can be configured to generate a pulse width modulated signal with a duty cycle that is proportional to current through the DC link. The threshold detection system can be configured to determine whether the duty cycle exceeds a selected threshold. The threshold detection system can include any suitable structure configured to perform the above function (e.g., as described below). Any other suitable function for the threshold detection system (e.g., voltage monitoring and/or current monitoring at any suitable location) is contemplated herein.

In accordance with at least one aspect of this disclosure, referring to FIGS. 1 and 2, a threshold detection system 100 can include a clock module 101 configured to receive a first frequency signal of a first frequency and to output a second frequency signal having a second frequency (e.g., $f_2$) different than the first frequency (e.g., $f_2=1/A*f_1$, where A is an integer). For example, the second frequency can be ½ the first frequency, for example. The system 100 can include a delay module 103 configured to receive the second frequency signal, to delay the second frequency signal to create a third frequency signal having the second frequency with a time delay relative to the first frequency, and to output the third frequency signal. The system 100 can include a switch module 105 configured to receive the first frequency signal and the third frequency signal. The switch module 105 can be configured to switch from a first output state (e.g., pulled low) to a second output state (e.g., pulled high) when a duty cycle of the first frequency signal passes a duty cycle threshold (e.g., below a low threshold).

The system 100 can include a modulator 107 configured to receive a sense signal (e.g., voltage across a sense resistor 109) and to convert the sense signal (e.g., a voltage difference) to the first frequency signal. The modulator 107 can be operatively connected to the clock module 101 and the switch module 105 to output the first frequency signal thereto. The sense signal can be a voltage signal or current signal, for example (e.g., a resistor sense signal as shown). The modulator 107 can be configured to connect to a DC link current sense resistor, for example.

The clock module 101 can be a frequency divider such that the second frequency is an integer division (e.g., ½ times) of the first frequency. In certain embodiments, the second frequency signal can have a fixed duty cycle (e.g., 50%).

As shown in FIGS. 1 and 2, the clock module 101 can be a first D flip flop having a first input (e.g., D of clock module 101), a clock input (e.g., CLK of clock module 101), first output (e.g., Q of clock module 101), and a second output (e.g., $Q_Z$ of clock module 101) reverse to the first output (e.g., Q of clock module 101). The clock input (e.g., CLK of clock module 101) can receive the first frequency signal. The first input (e.g., Q of clock module 101) can be operatively connected to the second output (e.g., $Q_Z$ of clock module 101) to receive feedback therefrom. The first output (e.g., Q of clock module 101) can output the second frequency signal. Any other suitable inputs and/or outputs, e.g., as appreciated by those having ordinary skill in the art, are contemplated herein (e.g., power/reference voltage input $V_{CC}$, CLRZ connected to the reference voltage $V_{CC}$, PREZ connected to the reference voltage $V_{CC}$, Ground GND etc.).

The delay module 103 can include a logic block 103a comprising a first input (e.g., B of logic block 103a), a second input (e.g., A of logic block 103a), and a logic output (e.g., Y of logic block 103a). The logic block 103a can be connected to the clock module 101 via a first line 103b at the first input (e.g., B of logic block 103a) and to output the third frequency signal at the logic output (e.g., Y of logic block 103a). The logic block 103 can be an AND block, for example. The AND block can be configured to change state when both inputs are receiving a signal, such that the output is the third frequency signal (which can be the second frequency signal, but time delayed). Any other suitable inputs and/or outputs, e.g., as appreciated by those having ordinary skill in the art, are contemplated herein (e.g., power/reference voltage input $V_{CC}$, Ground GND, etc.).

The delay module 103 can include a resistor 103c disposed between the first output (e.g., Q of clock module 101) of the clock module 101 and a first input (e.g., B of logic block 103a) of the delay module 103 on the first line 103b. The delay module 103 can include a capacitor 103d connected between the first line 103b and a ground 103e at a point 103f between the resistor 103c and the first input (e.g., B of logic block 103a).

The second input (e.g., A of logic block 103a) of the delay module 103 can be operatively connected to a voltage $V_{CC}$ (e.g., 3.3V as shown), for example (e.g., which can be always high). In this regard, the state of the logic output (e.g., Y of logic block 103a) will continue to oscillate with the input of the second frequency signal at the same frequency of the second frequency signal, but with the added delay from the delay module 103.

The switch module 105 can be a second D flip flop having a switch input (D of switch module 105) configured to receive the first frequency signal, a switch clock input (CLK of switch module 105) connected to the logic output (e.g., Y of logic block 103a) of the logic block 103a to receive the third frequency signal from the logic block 103a, and a state output ($Q_Z$ of switch module 105) configured to output either the first state (e.g., pulled low, e.g., 0V) or the second state (e.g., pulled high, e.g., to $V_{CC}$). Referring additionally to FIGS. 3A, 3B, and 3C, the state output ($Q_Z$ of switch module 105) of the switch module 105 (shown in on bottom of FIGS. 3A-3C) can be configured to switch from the first output state (e.g., pulled low to 0) to the second output state (e.g., pulled high to 1) when a rising edge or limit of the third frequency signal (shown on top chart of FIGS. 3A-3C) occurs outside of a duty cycle of the first frequency pulse (shown in the middle chart of FIGS. 3A-3C). Any other suitable inputs and/or outputs, e.g., as appreciated by those having ordinary skill in the art, are contemplated herein (e.g., power/reference voltage input $V_{CC}$, CLRZ connected to the reference voltage $V_{CC}$, PREZ connected to the reference voltage $V_{CC}$, Ground GND etc.).

In certain embodiments, the duty cycle threshold can be a low threshold such that when the duty cycle of the first frequency pulse is below the low threshold, the rising edge of the third frequency signal occurs outside of a duty cycle of the first frequency pulse. In certain embodiments, the duty cycle threshold can be about 10%, for example.

In accordance with at least one aspect of this disclosure, referring to FIGS. 1 and 2, an electric motor system 150 can include a first threshold detection system 100 (e.g., top) operatively connected to a first high voltage DC link line 151 (e.g., positive) and a second threshold detection system 100 (bottom) operatively connected to a second high voltage DC link line 153 (e.g., negative). It is contemplated that the first and second threshold detection system can be the same, similar, or different than each other in any suitable manner. Each threshold detection system can be any suitable embodiment of a threshold detection system disclosed herein, e.g., as described above. The motor system 150 can include an OR block 155 operatively connected to each switch module 100 at an input (e.g., inputs A and B of OR block 155) of the OR block 155. The OR block 155 can be configured to output a shutdown state (e.g., pull high) if either switch module 100 is outputting the second output state (e.g., pulled high). As shown in FIG. 4, the motor system 150 can include a gate drive 157 operatively connected to the OR block 155 and configured to shut down current to an electric motor when the OR block 155 is outputting the shutdown state.

In accordance with at least one aspect of this disclosure, a method for monitoring a DC link for overcurrent can include selecting a current threshold that is indicative of an overcurrent condition and generating a pulse width modulated signal with a duty cycle that is proportional to current through the DC link. The method can include determining whether the duty cycle exceeds the selected threshold.

In accordance with at least one aspect of this disclosure, a method for monitoring a high voltage DC link for overcurrent, can include pulse width modulating a voltage or current sense signal to output a first frequency signal, and determining if a duty cycle of the first frequency signal has passed a duty cycle threshold. Determining can include using the first frequency signal to create a constant duty cycle clock signal to compare the first frequency signal against. Determining can include using a D flip flop switch to compare the first frequency signal to the constant duty cycle clock signal. The method can include shutting down an electric motor if the duty cycle threshold is passed.

In embodiments, modulators can be off the shelf components that output pulse width modulation (PWM) and output a corresponding duty cycle of PWM based on a set value. For example, a correlation between current value (e.g., determined by voltage drop on a sense resistor) and PWM duty cycle can be selectable to a desired value. Downstream components can be set to flip at a predetermined duty cycle output by the modulator. Embodiments react very fast.

An embodiment is simulated for the expected PWM output with varying duty cycle and generated clock from PWM output as shown in FIG. 2. The results are shown in FIGS. 3A-3C. Both Positive and Negative DC link current can be sensed independently using similar blocks. Positive DC link current sense circuit can include a D Flip Flop (U1) used as a frequency divider for clock generation from the PWM data output. The generated clock passes through a delay circuit that can have an RC with AND logic (U2). The delayed clock signal can be connected to a D Flip Flop (U3) as CLOCK input and PWM output as DATA input (a PWM signal with varying duty cycle from 0-50%). A similar circuit can be used for negative DC link current sense as well. The circuit can detect the over current faults by making the D Flip Flop (U3) output to HIGH if the duty cycle is ≤10%, for example. Both positive and negative current sense outputs can be connected to OR logic (U7), so either of the output is HIGH, the OR gate output is high. The clock signal input to U3 can be ½ the frequency of PWM, for example, to be much slower than the data coming in.

FIG. 3A shows the resulted output for the data output (PWM output) which is varying from 0% to 50% duty cycle. The clock input, data output (PWM as expected from the modulator) and output from the D Flip Flop has been captured as a part of simulation. In the simulation, PWM frequency are set to 10 MHz varying 0 to 50% duty cycle and clock generated from the PWM frequency is 5 MHz. D Flip Flop output will be low when the PWM duty cycle is >10% and it goes HIGH when the duty cycle is ≤10% (10.0%) as shown in FIG. 3A. Flip Flop output comes back to LOW once the duty cycle is back to >10% (10.4%) as shown in FIG. 3B. This shows any output data ≤10% will make the D Flip Flop output from LOW to HIGH and the same HIGH output will be available at OR logic output.

FIG. 3C shows that worst case propagation delay in identifying the fault was about 102.2 ns in this embodiment. All the components selected can have operational temperatures of −55° C. to 125° C. The simulated circuit, as shown, takes 102.2 ns to detect any fault with high going output. FIG. 3C shows the worst case delay in identifying the fault with 10 MHz clock as the clock frequency, which is half the PWM data output frequency. Depending on the fault occurrence, the worst case fault detection would take approximately one clock cycle time, for example.

Embodiments provides ultrafast response time compared to other solutions with better accuracy and comparatively less price. Embodiments can also works for a −55° C. to 125° C. temperature range, for example. Any other suitable temperature range is contemplated herein.

Current measurement plays an important role in Motor Drive Electronics (MDE) applications. There are various currents such as 3Φ AC/DC input current, 3Φ AC Motor phase currents, High voltage DC Link current, Inverter leg current etc. This measured data is used for motor control, protection and safety power management purposes. Due to the low thermal handling capabilities of semiconductor devices, the power switches are the weakest/Un-reliable parts in the MDE if not operated properly.

Out of all the specified measurements, DC link current measurement plays an important role to compute the motor phase current indirectly and monitor the health of the power devices during the switching operation. Measurement of both positive DC link and negative DC link current provides opportunity to detect different fault conditions of the power switches to be protected in a Motor Drive System. As DC link current directly relates to the power switch current and motor current as well, the DC link current measurement is a necessity to protect major power electronics components of the MDE from the over load, short circuits, and over temperature conditions. The DC link current more than the specified range indicates that the power devices are operating under unsafe conditions (shoot through/short circuit or motor fault or motor shaft over load).

DC link current measurement interface should detect a DC over current fault (Discrete output) when there is an excessive current flowing out of DC bus. Different actions can be taken to safe guard power devices based on the fault detection, e.g., to protect against shoot through. Generally the power devices can be rated for a 10 us short circuit capability for 6-7 times the nominal current.

There are various techniques used to measure the DC link current and the output can be be in the form of voltage ranging from mV to volts depending on the techniques used for sensing the current. Traditional techniques used for current sensing have challenges and limitations. Embodiments provide an architecture for sensed high voltage DC link current signal processing with very less latency and high accuracy. Embodiments can be used not only for DC link current sensing, but can also be used for motor phase and inverter leg current etc. in the motor drive electronics. Any other suitable application for threshold detection for any purpose is contemplated herein.

Embodiments can include a modulator which senses the DC link current through sense resistor connected and provides the data output in the form of PWM signal with varying duty cycle depending on the amount of DC link current. Both positive and negative DC link currents can be sensed and processed independently with individual circuits. Embodiments can include a common clock, e.g., with maximum clock frequency of 20 MHz that is provided to the modulator to fetch the data from modulator. The clock for the modulator is optional as some of the modulator devices have their own internal clock with data output that eliminates the use of external clock. The PWM data output of the modulator can be connected to D Flip Flop as s DATA input. A Clock signal required for the D Flip Flop can be generated from the PWM data output itself, using another D Flip Flop as a frequency divider. The generated clock can be delayed slightly using, e.g., an RC network including AND logic and connected to a D Flip Flop through which the PWM data output is processed. The D Flip Flop can be positive edge triggered and configured to work as a Flip Flop with slightly delayed clock signal derived from the PWM data output as a CLOCK and PWM data output as DATA input (e.g., as shown in FIG. 2). The D Flip Flop can change it's OUTPUT initially with the DATA input during the rising edge of the clock signal and retain in the same state unless there is a change in the DATA during next rising edge of clock pulse. The delay (by RC components and AND logic) in the CLOCK input (derived from the PWM data output of the modulator using another D Flip Flop) can be set in a way that D Flip Flop changes its output state to high when the PWM duty cycle is less than or equal to 10%, for example. The same circuit blocks can be used for both Positive and Negative DC link current sense, whereas the positive link current can be sensed in reverse direction as negative current so that the same circuit blocks can be used for processing, for example. Both sense circuit outputs (D Flip Flop outputs) can be connected to an OR logic, so if either of positive/negative current fault status will make the output status HIGH. The circuit can be configured to change the output state of OR gate to HIGH if the DATA input PWM signal duty cycle is ≤10%. Duty cycle ≤10% will provide the false output state indicating there is a fault current.

The D Flip Flop OUTPUT state can come back to LOW position only when the PWM duty cycle is >10%. For example, if the sense resistor of 25 milli ohms generates a voltage ranging from 0 to −250 mV for the range 0A to −10A, for which the duty cycle varies between 50% (for 0A) to 10% (for −10A). If any current less than or equal to −10A (≤10%), the system can detect an over current fault. The response time of the D Flip Flop circuit while identifying the fault current can be <160 ns (100 ns for detecting a fault, 40 ns is modulator access time and 10 ns for output digital logic) at clock frequency of 10 MHz (e.g., as shown in FIG. 4). The overall response time of embodiments at a 20 MHz clock input can be close to 100 ns. The interface can generate output in discrete form which could be used to shut down the gate signals also input for the processor. Embodiments of a current sense interface can eliminate most of the delay in traditional systems.

In embodiments, the fault identification and shut down can be completely independent of controller/processor operation though the sensed output is in PWM (digital form) and embodiments can provide standalone architecture for over current detection for different applications without limiting the overall control processor bandwidths. All the circuit components can be selected for an operational temperature range of about −55° C. to about +125° C., for example.

Embodiments can provide a standalone architecture for DC link Over Current detection with faster response time that cannot be achieved by any other existing schemes. Embodiments can utilize the varied duty cycle PWM signal generated by modulator based device, RC delay, and D-Flip Flop. The PWM duty cycle can vary linearly from 0 to 100% based on the sensed DC Link current. This PWM signal can be connected to D input of the Flip-Flop, and the CLK input for the Flip-Flop can be derived from PWM signal and RC delay with AND logic. Embodiments can sense the current with a clock frequency up to 20 MHz, for example. Embodiments achieve over current detection response time and accuracies less than about 200 ns for example and about 5% over the ambient temperature of −55° C. to +90° C. Embodiments reduce the power device short circuit ratings low as 2 uS and are easy to implement shoot through protection. Embodiments can provide configurable current threshold detection without any intelligent devices and can work as a standalone, reducing the burden on processors, etc., to detect overcurrent.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a circuit, module, or system. A circuit, module, or system can include one or more portions of one or more separate physical hardware and/or software components that can together perform the disclosed function of the circuit, module, or system, or a circuit, module, or system can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user computer, partly on the user computer, as a stand-alone software package, partly on the user computer and partly on a remote computer or entirely on the remote computer or server. In the latter scenario, the remote computer may be connected to the user computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., about, approximately, around) used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles a, an, and the as used herein and in the appended claims are used herein to refer to one or to more than one (i.e., to at least one) of the grammatical object of the article unless the context clearly indicates otherwise. By way of example, an element means one element or more than one element.

The phrase and/or, as used herein in the specification and in the claims, should be understood to mean either or both of the elements so conjoined, i.e., elements that are conjunctively present in some cases and disjunctively present in other cases. Multiple elements listed with and/or should be construed in the same fashion, i.e., one or more of the elements so conjoined. Other elements may optionally be present other than the elements specifically identified by the and/or clause, whether related or unrelated to those elements specifically identified. Thus, as a non-limiting example, a reference to A and/or B when used in conjunction with open-ended language such as comprising can refer, in one embodiment, to A only (optionally including elements other than B); in another embodiment, to B only (optionally including elements other than A); in yet another embodiment, to both A and B (optionally including other elements); etc.

As used herein in the specification and in the claims, or should be understood to have the same meaning as and/or as defined above. For example, when separating items in a list, or or and/or shall be interpreted as being inclusive, i.e., the inclusion of at least one, but also including more than one, of a number or list of elements, and, optionally, additional unlisted items. Only terms clearly indicated to the contrary, such as only one of or exactly one of, or, when used in the claims, consisting of, will refer to the inclusion of exactly one element of a number or list of elements. In general, the term or as used herein shall only be interpreted as indicating exclusive alternatives (i.e., one or the other but not both) when preceded by terms of exclusivity, such as either, one of, only one of, or exactly one of.

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A threshold detection system configured to monitor a location for overcurrent, wherein the system is configured to generate a pulse width modulated signal with a duty cycle that is proportional to current through a DC link, wherein the system is configured to determine whether the duty cycle exceeds a selected threshold, wherein the system comprises:
   a clock module configured to receive a first frequency signal of a first frequency and to output a second frequency signal having a second frequency different than the first frequency;
   a delay module configured to receive the second frequency signal, to delay the second frequency signal to create a third frequency signal having the second frequency with a time delay relative to the first frequency, and to output the third frequency signal; and
   a switch module configured to receive the first frequency signal and the third frequency signal, wherein the switch module is configured to switch from a first output state to a second output state when a duty cycle of the first frequency signal passes a duty cycle threshold.

2. The system of claim 1, further comprising a modulator configured to receive a sense signal and to convert the sense signal to the first frequency signal, the modulator operatively connected to the clock module and the switch module to output the first frequency signal thereto.

3. The system of claim 2, wherein the sense signal includes a voltage signal or current signal.

4. The system of claim 2, wherein the modulator is configured to connect to a DC link current sense resistor.

5. The system of claim 1, wherein the clock module is a frequency divider such that the second frequency is an integer division of the first frequency.

6. The system of claim 5, wherein the clock module is a first D flip flop having a first input, a clock input, a first output, and a second output reverse to the first output, wherein the clock input receives the first frequency signal, wherein the first input is operatively connected to the second output to receive feedback therefrom, wherein the first output outputs the second frequency signal.

7. The system of claim 6, wherein the delay module includes a logic block comprising a first input, a second input, and a logic output, wherein the logic block is connected to the clock module via a first line at the first input and to output the third frequency signal at the logic output.

8. The system of claim 7, wherein the logic block is an AND block.

9. The system of claim 8, wherein the delay module includes a resistor disposed between the first output of the clock module and a first input of the delay module on the first line, and wherein the delay module includes a capacitor connected between the first line and a ground at a point between the resistor and the first input.

10. The system of claim 8, wherein the second input of the delay module is operatively connected to a voltage $V_{CC}$.

11. The system of claim 8, wherein the switch module is a second D flip flop having a switch input configured to receive the first frequency signal, a switch clock input connected to the logic output of the logic block to receive the third frequency signal from the logic block, and a state output configured to output either the first state or the second state.

12. The system of claim 11, wherein the state output of the switch module is configured to switch from the first output state to the second output state when a rising edge or limit of the third frequency signal occurs outside of a duty cycle of the first frequency pulse.

13. The system of claim 11, wherein the duty cycle threshold is a low threshold such that when the duty cycle of the first frequency pulse is below the low threshold, the rising edge of the third frequency signal occurs outside of a duty cycle of the first frequency pulse.

14. An electric motor system, comprising:
   a first threshold detection system operatively connected to a first high voltage DC link line and a second threshold detection system operatively connected to a second high voltage DC link line, each threshold detection system, comprising:
   a clock module configured to receive a first frequency signal of a first frequency and to output a second frequency signal having a second frequency different than the first frequency;
   a delay module configured to receive the second frequency signal, to delay the second frequency signal to create a third frequency signal having the second frequency with a time delay relative to the first frequency, and to output the third frequency signal; and
   a switch module configured to receive the first frequency signal and the third frequency signal, wherein the switch module is configured to switch from a first output state to a second output state when a duty cycle of the first frequency signal passes a duty cycle threshold;
   a modulator configured to receive a sense signal from the first high voltage DC link line and to convert the sense signal to the first frequency signal, the modulator operatively connected to the clock module and the switch module to output the first frequency signal thereto.

15. The motor system of claim 14, further comprising an OR block operatively connected to each switch module at an input of the OR block and configured to output a shutdown state if either switch module is outputting the second output state.

16. The motor system of claim 15, further comprising a gate drive operatively connected to the OR block and configured to shut down current to an electric motor when the OR block is outputting the shutdown state.

17. A method for monitoring a DC link for overcurrent, comprising:
   selecting a current threshold that is indicative of an overcurrent condition;

generating a pulse width modulated signal with a duty cycle that is proportional to current through the DC link; and determining whether the duty cycle exceeds the selected threshold, wherein determining includes using the first frequency signal to create a constant duty cycle clock signal to compare the first frequency signal against.

18. The method of claim 17, wherein determining includes using a D flip flop switch to compare the first frequency signal to the constant duty cycle clock signal.

* * * * *